UNITED STATES PATENT OFFICE.

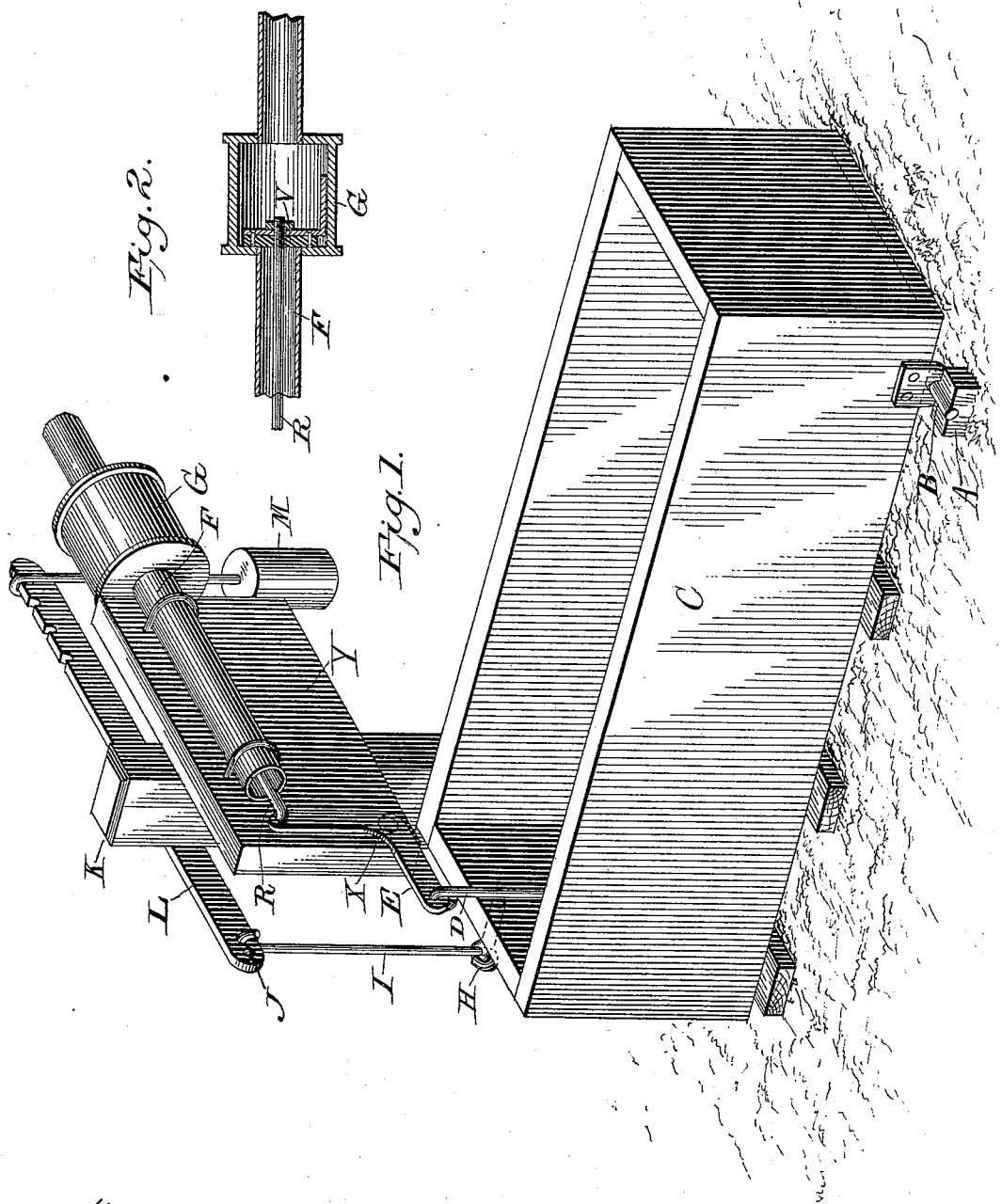

WILLIAM L. MAGEE, OF BETHANY, MISSOURI.

WATERING-TROUGH FOR STOCK.

SPECIFICATION forming part of Letters Patent No. 450,170, dated April 14, 1891.

Application filed April 8, 1890. Serial No. 347,137. (No model.)

*To all whom it may concern:*

Be it known that I, WILLIAM L. MAGEE, a citizen of the United States of America, residing at Bethany, in the county of Harrison and State of Missouri, have invented certain new and useful Improvements in Watering-Troughs for Stock and other Purposes, of which the following is a description.

In the accompanying drawings, Figure 1 is a perspective view, and Fig. 2 a detail sectional view, of the cylinder within which the valve works, the supply and discharge pipes for said cylinder being broken away.

B B represent iron rods resting upon the supports A A, to which the stationary end of the trough is fastened.

C represents the watering-trough.

D represents an iron rod extending from the bottom of the trough and having one of its ends fastened to the end of the elbow or bell-crank lever E, which is fulcrumed at X on a block Y, the other end of said bell-crank lever being attached to an iron rod R, running back through the water-pipe F to the valve V in the cylindrical tube G. This tube G is attached to the supply-pipe F or an enlargement of the pipe, in which is the valve V, which opens or closes the passage through pipe F.

H represents a bail or fastening by which one end of the trough is lifted or lowered.

I represents a rod extending from the bail H to the lever L to windmill, and is detachably secured thereto.

K represents a support or post to which the supply-pipe F and the lever L are fastened.

M represents a weight upon the lever L, which is intended to lift the trough when it is nearly empty of water.

Y represents a block fastened to the support K, and to which the supply-pipe is fastened, so that the water therefrom may flow into the water-trough.

The weight M is intended to be sufficiently heavy and so adjusted as to raise the unfastened or bail end of the trough when the water is nearly exhausted from the trough. The trough being raised lifts the rod D and also raises the end of the elbow-lever E, to which it is fastened. The other end of said elbow-lever being attached to the rod R pushes the rod back in the supply-pipe F, thus opening the valve V in the cylinder G and permitting the water to flow through the pipe until the trough is nearly filled and becomes too heavy for the weight M. The trough is lowered, thus pulling down the outer end of the elbow-lever E, and pulling the rod R in the supply-pipe closes the valve V, thus shutting off and stopping the flow of the water until the water in the trough is again lowered, when the trough is raised and opens the valve again, admitting a fresh supply of water to the trough.

The water-trough does not stand upon a pivotal point, nor is it readily turned one way or the other, as one might at first view suppose. When the water is reduced in the trough so that the weight lifts the bail end of the trough, the water in that end flows to the other or lower end of the trough, and when the trough is sufficiently filled again to lower that end the water then flows back toward the bail end and becomes deeper and heavier than before it is lowered.

Having now described my invention, what I believe to be new, and desire to secure by Letters Patent, and what I therefore claim, is—

A water-trough comprising the following parts in combination: a water-trough pivotally mounted at its forward end, a weighted lever connected with the rear end of said trough, the cylindrical tube G, connected with a source of water-supply, a water-pipe extending from said tube toward said trough, an elbow-lever having its lower end connected with the rear end of said trough, a valve in said tube, and a rod connecting together the upper end of said elbow-lever and said valve.

WILLIAM L. MAGEE.

Witnesses:
   ISAIAH J. GENTRY,
   MARSHAL K. HOWELL.